United States Patent [19]

Rosenstock et al.

[11] Patent Number: 5,223,147
[45] Date of Patent: Jun. 29, 1993

[54] PROCESS OF TREATING CONTAMINATED SOILS

[75] Inventors: Friedrich Rosenstock, Frankfurt am Main; Jochen Güntner, Kahl; Elmar Haite, Frankfurt am Main; Horst Dittmann, Büdingen, all of Fed. Rep. of Germany

[73] Assignee: Metallgesellschaft Aktiengesellschaft, Frankfurt, Fed. Rep. of Germany

[21] Appl. No.: 802,948

[22] Filed: Dec. 6, 1991

[30] Foreign Application Priority Data

Dec. 7, 1990 [DE] Fed. Rep. of Germany ....... 4039109

[51] Int. Cl.$^5$ .................. B01D 17/035; B03D 1/02; B08B 3/04; B09B 5/00
[52] U.S. Cl. .................................. 210/705; 210/768; 210/804; 210/908; 210/909; 210/922; 210/806; 134/10; 134/25.1; 134/40; 209/10; 241/20; 241/21; 241/24; 252/61
[58] Field of Search .............. 241/20, 24, 21; 134/10, 134/25.1, 40; 252/61; 210/705, 706, 707, 768, 922, 908, 909, 806, 910, 804; 209/164, 166, 10

[56] References Cited

U.S. PATENT DOCUMENTS

| | | | |
|---|---|---|---|
| 4,336,136 | 6/1982 | Giguere | 210/178 |
| 4,392,892 | 7/1983 | Wagner | 134/40 |
| 4,424,081 | 1/1984 | Giguere | 134/10 |
| 4,732,666 | 3/1988 | Welgemoed | 209/166 |
| 4,737,273 | 4/1988 | Snow | 209/166 |
| 4,783,263 | 11/1988 | Trost | 210/908 |
| 4,851,123 | 7/1989 | Mishra | 210/705 |
| 4,923,125 | 5/1990 | Bateson | 241/21 |
| 4,969,775 | 11/1990 | Cappel | 210/767 |
| 5,019,245 | 5/1991 | Ignasiak | 210/909 |
| 5,056,541 | 10/1991 | Schade | 134/10 |

FOREIGN PATENT DOCUMENTS

| | | | |
|---|---|---|---|
| 178009 | 4/1986 | European Pat. Off. | 210/705 |
| 0251562 | 6/1987 | European Pat. Off. | |
| 0313116 | 8/1988 | European Pat. Off. | |
| 2072700 | 2/1981 | United Kingdom. | |
| 2093735 | 2/1981 | United Kingdom. | |

*Primary Examiner*—Thomas M. Lithgow
*Attorney, Agent, or Firm*—Sprung Horn Kramer & Woods

[57] ABSTRACT

Contaminated soils are treated in that an aqueous slurry of the soil is separated into a coarse fraction and a fine fraction, the fine fraction is subjected to flotation, the resulting froth is dewatered and then carried away as a pollutant concentrate, and the underflow from the flotation is dewatered and is then carried away as purified soil. An emulsified oily vegetable oil is used as a collector agent for the selective flotation or an emulsified light mineral oil is used as a collector agent for the selective flotation and a light mineral oil is stirred as a conditioning agent into the fine fraction before it is subjected to the selective flotation.

10 Claims, No Drawings

PROCESS OF TREATING CONTAMINATED SOILS

DESCRIPTION

This invention relates to a process of treating contaminated soils in that an aqueous slurry of the soil is separated into a coarse fraction and a fine fraction, the fine fraction is subjected to flotation, the resulting froth is dewatered and then carried away as a pollutant concentrate, and the underflow from the flotation is dewatered and is then carried away as purified soil.

The decontamination soils or dumps which are contaminated by hydrocarbons, oil and/or heavy metals is highly expensive. For this reason it has been proposed to separate such soils into a part which is not or only slightly contaminated and a part which contains a major part of the impurities in concentrated form. That part can then be decontaminated in a simpler manner at much lower cost.

From J. E. Garnett, D. L. Mitchell, T. T. Faccini in "Initial Testing of Pilot Equipment for Soil Decontamination", REP-3022, PIC-4500, DE-AC 04-76 DP 03533, U.S. Dept. of Energy, Oct. 17, 1980, it is known that soils which are contaminated by plutonium-laden oil can be subjected to a wet processing. In such soils the plutonium is associated with the fine-grained constituents, which are separated from the coarse constituents. The soil is initially treated in a drum washer, in which dry lumps are crushed and oil is washed from gravel and coarse sand by means of an aqueous solution of NaOH having a pH value of 11. To improve the agitation of the slurry the drum is provided with small blades. The drum is provided at its outlet with a sieve, through which about 50% are passed as oversize fraction above 4 mm. The undersize fraction is passed through a sieve and the fraction above 0.5 mm is disposed of. The fraction below 0.5 mm is separated by hydrocycloning and centrifugation into a fraction above 0.05 mm and a fraction below 0.05 mm. The fraction below 0.05 mm is separated into solids and washing liquid by flocculation and centrifugation. The washing liquid is recycled to the drum washer and the sieves.

U.S. Pat. No. 4,336,136 discloses a process in which a purification is also effected in a drum and the washing solution also contains NaOH. The treatment in the drum is accompanied by a supply of steam. The drum rotates at a speed of one revolution per minute. A complete treating cycle consists of eight revolutions of the drum. The material which has been discharged is separated by sieving into a coarse fraction and a fine one. The coarse fraction and the very coarse fraction which has been separated before the feeding to the drums are dipped in a sieve basket into a solvent and are thus purified. Steam and air are introduced into the fine-grained fraction to detach the air and strip the oil from the surface. The solids which have been separated still contain about 30% of the oil which has been introduced and are subjected to a flotation. The remaining oil is removed by fatty acids or alcohols, such as mono- and-/or dimethylphenols (cresylic acids), eucalyptus oils, pine oils, alkyl ether, phenyl ether of propylene, or glycols, which are used as frothing agents for the flotation. The oil particles which are bound to the froth are discharged with the froth and are then separated from the froth.

In the processes described hereinbefore an alkaline solution is used as a dispersion so that chemical reactions with constituents of the soil cannot be precluded. Besides, the purified soil will always contain part of said sodium hydroxide solution.

U.S. Pat. No. 4,783,263 describes a process in which foreign matter is removed by crushing and sieving so that a material which is physically uniform is obtained, which is charged into a tank and is stirred therein with added surfactants and/or alkaline reagents to form a sludge phase. The surfactants and/or alkaline reagents effect a removal of impurities from the solid particles by desorption or otherwise and cause the impurities to enter the liquid phase of the sludge. This is succeeded by a multistage flotation in a countercurrent to a collector agent which is supplied. The collector agent and the impurities are carried away as a pollutant concentrate. The solids discharged from the last flotation cell are thickened and optionally filtered and are then carried away as purified soil. Organic matter is removed by adsorption onto carbon, ion exchange or reverse osmosis from the liquid which has become available.

Published German Application 38 15 461 discloses a process in which the contaminated soils are agitated in a drum, which is supplied with loose lumps serving as grinding bodies and in which the net energy input amounts to 4 to 16 kWh per 1000 kg of throughput and which is operated at a speed of 50 to 90% of the critical speed $$n_{crit} = \frac{42.4}{\sqrt{D}} \text{ (r.p.m.)}$$

The aqueous slurry discharged from the drum is separated by sieving into a coarser fraction and a finer one, the coarser fraction is carried away as a purified fraction, the fine fraction is desludged, the separated sludge is dewatered and is then carried away as a pollutant concentrate, and the desludged remainder of the finer fraction is dewatered and is then carried away as purified soil. In a variant, the agitation in the drum requires a net energy input of 1 to 6 kWh per 1000 kg throughput and the remaining fine fraction which has been desludged is agitated in a second drum, which is supplied with loose lumps serving as grinding bodies and in which the net energy input amounts to 4 to 16 kWh per 1000 kg throughput, the aqueous slurry discharged from the second drum is desludged, the separated sludge is dewatered and is then carried away as a pollutant concentrate, and the desludged second remainder of the finer fraction is dewatered and is then carried away as purified soil. In both variants of the process the desludged remainder of the finer fraction is preferably subjected to a flotation, for which collector agents are used. The resulting froth is carried off as a pollutant concentrate and the underflow is dewatered and is then carried away as purified soil. The sieving of the aqueous slurry into a coarser fraction and a finer one is effected with a sieve cut of about 1 to 2 mm. The coarser fraction may be separated into two fractions with a sieve cut of about 6 mm. The intermediate fraction may be treated separately, e.g., in that it is supplied to the second drum. That process permits a concentration of a large part of the impurities in a relatively small part of the soils and a re-use of the decontaminated part of the soils. There will be bo sewage problem because the impurities are bound to the fine solids and are not dissolved in the water and because the aqueous phase is recirculated.

SUMMARY OF THE INVENTION

It is an object of the invention to further improve the decontamination of the purified part of the soils.

That object is accomplished in accordance with the invention in that an emulsified oily vegetable fat is used as a collector agent for the selective flotation.

The term "oily vegetable fat" describes vegetable fats which at the temperature at which the selective flotation is effected are liquid and have a low viscosity. Particularly suitable substances are rapeseed oil, colza oil, soybean oil, sunflower seed oil, peanut oil, palm oil, olive oil, cottonseed oil, sesame oil, and linseed oil. Modified oils, such as rapeseed oil methyl ester, may also be used. The flotation with such oily vegetable fats produces very good results and the small amounts of the collector agents which remain in the purified soils consist of natural substances, which are degradable and ecologically innocuous.

According to a preferred feature emulsifying agents are employed which comprise substances which are readily degradable and/or ecologically innocuous. Such substances are, e.g., vitamin E, sulfonamidocarbocyclic acid and ethoxylated glycerol-fatty acid esters. In that case even the small residues of the emulsifying agent which remain in the purified soil will also consist of natural substances which are degradable and ecologically innocuous.

According to a preferred feature an oily vegetable fat is stirred as a conditioning agent into the aqueous fine fraction before it is subjected to the selective flotation. The conditioning agent is dispersed as it is stirred into the fine fraction. The same oily vegetable oil is preferably used for that purpose as for the collector agent used for the flotation. The conditioning agent may also be emulsified. The conditioning will improve the result of the selective flotation even if the same substances are used as a conditioning agent and as a collector agent.

In accordance with the invention the object can also be accomplished in that an emulsified mineral light oil is used as a collector agent for the selective flotation and a mineral light oil is stirred as a conditioning agent into the fine fraction before it is subjected to the selective flotation. The light mineral oils which are employed consist particularly of diesel oil or light heating fuel oil. The conditioning agent is dispersed as it is stirred into the fine fraction and is desirably used in emulsified form. The result of the selective flotation will be improved considerably by the previous conditioning even if the same substances are employed.

According to a preferred feature the conditioning agent is permitted to act for 2 to 20 minutes before the flotation. That time of action will substantially improve the selective flotation.

According to a preferred feature the light oil is added at a rate of 50 to 1000 g per 1000 kg solids. This will substantially improve the selective flotation.

According to a preferred feature a frothing agent is used for the selective flotation. For instance, modified pine in can be used with good results as a frothing agent. This will permit a selective flotation with very good results.

The process in accordance with the invention can be carried out with particularly good results in combination with the above-described process disclosed in Published German Application 38 15 461.

According to a preferred feature a coarse fraction having a particle size range of 1 to 30 mm is separated and combustible solid constituents are removed by a gravity separation from the coarse fraction. In dependence on the nature of the soils a somewhat higher lower limit and a somewhat lower upper limit may be selected. In the gravimetric separation the material is loosened up by the action of hydrodynamic forces and is then stratified by density. As a result, the particles having a lower relative density will be arranged over those having a higher relative density in the settled bed so that a succession of strata is obtained which have densities that decrease from bottom to top. By suitable discharging means said succession can be separated into products different in quality. Gravity separation may be effected, e.g., by pulsating jigs, shaking tables or helical separators. The light matter which is separated has a relative density of about $<1.8$ g/cm$^3$ and consists mainly of coal, wood, plant residues and possibly paper. Said substances will absorb a major part of the pollutants contained in the soil. The lightweight matter is combusted or dumped or otherwise disposed of.

According to a preferred feature the contaminated soil is treated in a drum which is supplied with loose lumps serving as grinding bodies and in which the net energy input amounts to 1 to 6 kWh per 1000 kg throughput and which is operated at a speed of 50 to 90% of the critical speed $$n_{crit} = \frac{42.4}{\sqrt{D}} \text{ (r.p.m.)}$$

The aqueous slurry discharged from the drum is separated into a coarse fraction having a particle size range of 1 to 30 mm and a fine fraction, the coarse fraction is separated by gravity separation into a light fraction, which contains the solid combustible constituents, and a decontaminated heavy fraction, the fine fraction is treated in a second drum, which is supplied with loose lumps, and in which the net energy input amounts to 4 to 16 kWh per 1000 kg of throughout and which is operated at a speed of 50 to 90% of the critical speed $$n_{crit} = \frac{42.4}{\sqrt{D}} \text{ (r.p.m.)}$$

The second aqueous slurry discharged from the second drum is subjected to a selective flotation, the resulting froth is dewatered and is then carried away as a pollutant concentrate, and the underflow is dewatered and is then carried away as purified soil. The conditioning agent used before the flotation is suitably supplied to the second drum. The conditioning agent may be supplied also to the first drum although this will involve a higher consumption owing to the deposition on the coarse fraction. The flotation is suitably carried out in two or more stages. The froths formed in the flotation cells are thickened in a baffle plate clarifier, from which the overflow is recycled as process water and the underflow is thickened further in a thickener. The overflow from that thickener is recycled as process water and the underflow is dewatered in a plate filter and is then carried away as a pollutant concentrate. The underflow from the flotation cells is also thickened in a baffle plate clarifier, from which the overflow is recycled as process water and the underflow is dewatered further on a belt filter and is then carried away as pure soil. Fresh water must usually be supplied to the process, but, if the contaminated soil has a very high moisture content, it will be possible to treat the filtrate from the plate filter in a simple manner because it does not contain toxic solutes. If dissolved salts have become enriched in the circulating aqueous phase, the filtrate from the plate filter can be purified and can then be recycled. The term "soils" is used herein for all materials which can be treated by the process, inclusive of dumps. In dependence on the nature of the soils they are passed through means for separating scrap and stones from the soils before they are supplied to the drum. The maximum particle size of the material to be treated is about 200 mm. The net energy input to the drum is the energy that is transferred to the shell of the drum, i.e., the energy input to the drum in its filled state minus the energy input in an empty state. The net energy input is related to the throughput of dry soil. The optimum value of the energy input in the range in accordance with the invention will depend on the nature of the soils and of the impurities and will be empirically determined. The lower limit of the energy input is preferably above 6 kWh per 1000 kg throughput because better results will generally be produced in that case. "D" is the diameter of the drum in meters. The soil is treated in the drum in such a manner that there is a strong abrasion at the surface of the particles. The energy input which is required for that purpose will necessarily result also in a certain reduction in size. The sieve cut will also depend on the nature of the soil and of the impurities and will be empirically determined. The aqueous medium in the drum usually consists of water, preferably of water which has been recycled from succeeding stages of the process. Sieving is desirably effected on a shaking sieve, which is sprayed with recycled water and/or fresh water. A supply of coarse particles to the shaking sieve can be avoided by a preliminary sieving, e.g., by means of a sieve basket provided at the outlet of the drum. The "lumps serving as grinding bodies" may consist of a natural material which is of the same kind as the soil or of a different kind and/or of artificial material or of steel balls.

According to a preferred feature the fine fraction which has been separated from the aqueous slurry discharged from the first drum is desludged, the desludged remainder of the fine fraction is supplied to the second drum, and the second aqueous slurry discharged from the second drum and the separated sludge are subjected to the selective flotation. Desludging is desirably effected by hydrocycloning. In that case the attrition of the fine fraction in the second drum will be effected in the absence of the sludge fraction, as will be desirable particularly if the sludge fraction is highly contaminated.

According to a preferred feature, any oversize which is contained in the aqueous slurry discharged from the first drum and has a larger particle size than the coarse fraction which has been separated is reduced in size in a crusher and is then recycled to the first drum. In that case the purity of the heavy fraction separated from the separated coarse fraction will be improved further.

The invention will be explained with reference to experiments in which the fine fraction was subjected to flotation (PAH=polocyclic aromatic hydrocarbons).

EXAMPLE 1

Diesel oil emulsified in water was used as a collector agent for the flotation as an emulsion.

|  | Quantity discharged (%) | Carbon content (%) | Carbon distribution (%) | PAH content (ppm) | PAH distribution (%) |
|---|---|---|---|---|---|
| Froth | 30.0 | 15.1 | 69.3 | 3900.0 | 97.7 |
| Underflow | 70.0 | 2.6 | 30.7 | 35.6 | 2.3 |
| Feed | 100.0 | 6.1 | 10.0 | 1116.5 | 100.0 |

EXAMPLE 2

The flotation was effected under the same conditions as in Example 1 but the aqueous fine fraction was conditioned by an addition of 880 g diesel oil per 1000 kg solids before it was subjected to the flotation. The conditioning agent was supplied to the second drum and was permitted to act for 8 minutes before the flotation.

|  | Quantity discharged (%) | Carbon content (%) | Carbon distribution (%) | PAH content (ppm) | PAH distribution (%) |
|---|---|---|---|---|---|
| Froth | 25.7 | 19.2 | 77.7 | 4300.0 | 99.1 |
| Underflow | 74.3 | 1.9 | 22.3 | 14.1 | 0.9 |
| Feed | 100.0 | 6.3 | 100.0 | 1115.8 | 100.0 |

EXAMPLE 3

Rapeseed oil was used as a collector agent for the flotation. The aqueous fine fraction was conditioned by an addition of 880 g rapeseed oil per 1000 kg solids before it was subjected to the flotation. The conditioning agent was supplied to the second drum and was permitted to act for 8 minutes before the flotation.

|  | Quantity discharged (%) | Carbon content (%) | Carbon distribution (%) | PAH content (ppm) | PAH distribution (%) |
|---|---|---|---|---|---|
| Froth | 24.7 | 21.2 | 83.3 | 4492.3 | 99.5 |
| Underflow | 75.3 | 1.4 | 16.7 | 8.2 | 0.5 |
| Feed | 100.0 | 6.3 | 100.0 | 1115.8 | 100.0 |

EXAMPLE 4

A different soil was treated in a first drum and the material discharged was sieved with a sieve cut of 1 mm to provide a coarse fraction and a fine fraction. The coarse fraction was subjected to gravity separation and the fine fraction was treated in a second drum. The material discharged from the second drum was subjected to a flotation, in which a rapeseed oil emulsion was used as a collector agent.

|  | Quantity discharged (%) | Carbon content (%) | Carbon distribution (%) | PAH content (ppm) | PAH distribution (%) |
|---|---|---|---|---|---|
| After the first drum |  |  |  |  |  |
| >1 mm | 27.2 | 9.4 | 36.6 | 63 | 31.2 |
| <1 mm | 72.8 | 6.1 | 63.4 | 51 | 68.8 |
| Raw soil | 100.0 | 7.0 | 100.0 | 54 | 100.0 |
| Flotation of fine fraction |  |  |  |  |  |
| Froth | 19.7 | 12.1 | 34.1 | 129 | 47.2 |
| Underflow | 53.1 | 3.8 | 29.3 | 22 | 21.6 |
| <1 mm | 72.8 | 6.1 | 63.4 | 51 | 68.8 |
| Gravity separation of coarse fraction |  |  |  |  |  |

-continued

|  | Quantity discharged (%) | Carbon content (%) | Carbon distribution (%) | PAH content (ppm) | PAH distribution (%) |
|---|---|---|---|---|---|
| Light fraction | 4.9 | 47.7 | 33.4 | 347 | 31.0 |
| Heavy fraction | 22.3 | 1.0 | 3.2 | 0.6 | 0.2 |
| >1 mm | 27.2 | 9.4 | 36.6 | 63 | 31.2 |

EXAMPLE 5

The same soil as in Example 4 was treated under the same conditions as in Example 4 but the fine fraction was conditioned by a supply of 500 g rapeseed oil per 1000 kg solids to the second drum before the fine fraction was subjected to flotation. The conditioning agent was permitted to act for 8 minutes before the flotation.

|  | Quantity discharged (%) | Carbon content (%) | Carbon distribution (%) | PAH content (ppm) | PAH distribution (%) |
|---|---|---|---|---|---|
| After the first drum |  |  |  |  |  |
| >1 mm | 27.2 | 9.4 | 36.9 | 68 | 31.5 |
| <1 mm | 72.8 | 6.0 | 63.1 | 51 | 68.5 |
| Raw soil | 100.0 | 6.9 | 100.0 | 54 | 100.0 |
| Flotation of fine fraction |  |  |  |  |  |
| Froth | 13.4 | 27.7 | 53.7 | 237 | 58.6 |
| Underflow | 59.4 | 1.1 | 9.4 | 9 | 9.9 |
| <1 mm | 72.8 | 6.0 | 63.1 | 51 | 68.5 |
| Gravity separation of coarse fraction |  |  |  |  |  |
| Light fraction | 4.9 | 47.7 | 33.7 | 347 | 31.3 |
| Heavy fraction | 22.3 | 1.0 | 3.2 | 0.6 | 0.2 |
| >1 mm | 27.2 | 9.4 | 36.9 | 63 | 31.9 |

It will be understood that the specification and examples are illustrative but not limitative of the present invention and that other embodiments within the spirit and scope of the invention will suggest themselves to those skilled in the art.

What is claimed is:

1. In the treating of soils contaminated with at least one pollutant selected from the group consisting of hydrocarbons, oils, heavy metals and combustible solid constituents by separating an aqueous slurry of the soil into a coarse fraction and a fine fraction, subjecting the fine fraction to froth flotation, dewatering the resulting froth and then carrying it away as a pollutant concentrate, dewatering the underflow from the flotation and then carrying away such dewatered underflow as purified soil, the improvement which comprises effecting the flotation in the presence of an emulsified oily vegetable fat which functions as a collector agent in the flotation.

2. A process according to claim 1, wherein the emulsifier of the oily vegetable fat comprises a substance which is ecologically degradable and/or ecologically innocuous.

3. A process according to claim 1, including the step of stirring a conditioning agent comprising an oily vegetable fat into the aqueous fine fraction before it is subjected to the froth flotation.

4. A process according to claim 3, wherein the time of action of the conditioning agent before the flotation is 2 to 20 minutes.

5. A process according to claim 3, wherein the conditioning agent is added at a rate of 50 to 1000 g per 1000 kg contaminated soils.

6. A process according to claim 1, wherein the froth flotation is effected in the presence of a frothing agent.

7. A process according to claim 1, including the further steps of separating from the coarse fraction a fraction having a particle size range of 1 to 30 mm and removing from the coarse fraction combustible solid constituents by gravity separation.

8. A process according to claim 1, wherein the contaminated soil is treated in a drum which is supplied with loose lumps serving as grinding bodies and in which the net energy input amounts to 1 to 6 kWh per 1000 kg throughput and which is operated at a speed of 50 to 90% of the critical speed $$n_{crit} = \frac{42.4}{\sqrt{D}} \text{ (r.p.m.)},$$

in which n is the critical speed and D is the diameter of the drum in meters, an aqueous slurry discharged from the drum is separated into said coarse fraction having a particle size range of 1 to 30 mm and said fine fraction, the coarse fraction is separated by gravity separation into a light fraction which contains the combustible solid constituents, and a decontaminated heavy fraction, the fine fraction is treated in a second drum which is supplied with loose lumps and in which the net energy input amounts to 4 to 16 kWh per 1000 kg of throughput and which is operated at a speed of 50 to 90% of the critical speed $$n_{crit} = \frac{42.4}{\sqrt{D}} \text{ (r.p.m.)},$$

a second aqueous slurry discharged from the second drum is subjected to said froth flotation, the resulting froth is dewatered and is then carried away as said pollutant concentrate, and the underflow is dewatered and is then carried away as said purified soil.

9. A process according to claim 8, wherein the fine fraction which has been separated from the aqueous slurry discharged from the first drum is desludged, the desludged remainder of the fine fraction is supplied to the second drum, and the second aqueous slurry discharged from the second drum and the separated sludge are subjected to the froth flotation.

10. A process according to claim 9, wherein oversize, which is contained in the aqueous slurry discharged from the first drum and has a larger particle size than the coarse fraction which has been separated is reduced in size in a crusher and is then recycled to the first drum.

* * * * *